United States Patent
Decker et al.

(10) Patent No.: US 11,046,421 B2
(45) Date of Patent: Jun. 29, 2021

(54) SLOTTED FLAPERON SEAL MECHANISM FOR AIRCRAFT DEVICES

(71) Applicant: Bell Helicopter Textron Inc., Fort Worth, TX (US)

(72) Inventors: George R. Decker, Mansfield, TX (US); Steven Allen Robedeau, Jr., Keller, TX (US)

(73) Assignee: Textron Innovations Inc., Fort Worth, TX (US)

( * ) Notice: Subject to any disclaimer, the term of this patent is extended or adjusted under 35 U.S.C. 154(b) by 303 days.

(21) Appl. No.: 16/164,033

(22) Filed: Oct. 18, 2018

(65) Prior Publication Data

US 2020/0122818 A1    Apr. 23, 2020

(51) Int. Cl.
  *B64C 9/02*   (2006.01)
  *B64C 9/18*   (2006.01)
  *B64C 29/00*  (2006.01)

(52) U.S. Cl.
  CPC .................. *B64C 9/02* (2013.01); *B64C 9/18* (2013.01); *B64C 29/0033* (2013.01)

(58) Field of Classification Search
  CPC ......... B64C 9/02; B64C 9/18; B64C 29/0033; B64C 27/04; B64C 9/04; B64C 7/00; Y02T 50/30
  See application file for complete search history.

(56) References Cited

U.S. PATENT DOCUMENTS

| | | | | |
|---|---|---|---|---|
| 2,666,603 A | * | 1/1954 | Horkey ..................... | B64C 9/02 244/90 B |
| 5,094,412 A | * | 3/1992 | Narramore ............... | B64C 9/04 244/214 |
| 6,981,676 B2 | * | 1/2006 | Milliere .................... | B64C 9/04 244/213 |
| 7,815,147 B2 | * | 10/2010 | Martin Hernandez ... | B64C 7/00 244/130 |

* cited by examiner

*Primary Examiner* — Medhat Badawi
*Assistant Examiner* — Vicente Rodriguez
(74) *Attorney, Agent, or Firm* — Patent Capital Group (57) ABSTRACT

One embodiment is an apparatus comprising an aircraft wing; a control surface hingedly connected to a trailing edge of the aircraft wing, wherein a slot is provided between the aircraft wing and the control surface; a seal disposed over the slot, the seal hingedly connected to the aircraft wing; a spring mechanism for preloading the seal against a surface of the control surface such that the gap is sealed with the control surface is in a first position relative to the aircraft wing; and at least one cam blade for lifting the seal from the surface of the control surface as the control surface moves from the first position to a second position relative to the aircraft wing and returning the seal to the surface of the control surface as the control surface moves from the second position to the first position.

15 Claims, 9 Drawing Sheets

SLOTTED FLAPERON SEAL MECHANISM FOR AIRCRAFT DEVICES

TECHNICAL FIELD

This disclosure relates generally to aircraft devices and, more particularly, to a slotted flaperon seal mechanism for such aircraft devices.

BACKGROUND

Tilt rotor aircraft represent an innovative step in the evolution of aircraft design. The tilt rotor design allows an aircraft to assume the vertical take-off and landing characteristics of a helicopter. Once in flight, the rotors can rotate forward, allowing the aircraft to fly like a fixed wing aircraft. To minimize the weight of the vehicle, a shorter stiffer wing is used, leaving little space for effective control surfaces.

A typical wing design for an aircraft includes a primary wing surface incorporating ailerons and flaps. The flaps are designed to increase wing lift while the ailerons are used for roll axis control. The flaps on each wing operate in unison to increase wing lift by increasing the camber of the wing. By comparison, ailerons are pivoted oppositely to increase lift on one wing while reducing lift on the opposite wing to induce a rolling moment. Due to the limited space available on the wing area of tilt rotor aircraft, in some designs, the functionality of flaps and ailerons have been combined into a single control surface referred to as a "flaperon." In some designs, at least one flaperon is provided on each wing of the aircraft. On take-off and landing, the flaperons are operated as flaps to provide additional wing lift. To induce aircraft roll, the flaperons are operated as ailerons to effect the maneuver.

Aerodynamic lift of a tilt rotor wing is dependent on, among other things, the amount of deflection of the flaperon, the size of the wing, the flight speed of the vehicle, and the state of the air that is flowing over the surface of the wing. To effectively produce lift, the air must flow smoothly over the wing without producing flow separation and the associated detrimental effects of that separation, such as wing stall and increased drag. During tiltrotor hover conditions, downward rotation (or extension) of the flaperons is required to minimize the download penalty created by the rotor downwash impinging on the upper wing surface. As the speed of the vehicle is increased, the lift force is increased due to increased dynamic pressure and less downward rotation of the flaperons is needed to generate the required lift force.

In one embodiment of the flaperon, an aerodynamic slot is provided between the wing and the flaperon, through which air can flow from the underside of the wing to the top in order to re-energize the local boundary layer formation and maintain attached airflow across the flaperon surface at higher angles. To prevent adverse flow through the slot during normal flight conditions (i.e. low flap angle deflections), which would degrade wing performance, a seal or sealing device prevents such flow between lower and upper wing surfaces. Since the flaperon must also rotate upward in the high speed forward condition to provide roll control, flow characteristics over this slot can be improved by a device that bridges the slot and provides a continuous flow surface.

SUMMARY

Embodiments shown and described herein include an apparatus comprising an aircraft wing; a control surface hingedly connected to a trailing edge of the aircraft wing, wherein an aerodynamic slot is provided between the aircraft wing and the control surface; a seal disposed over the aerodynamic slot, the seal having a hinged connection to the aircraft wing; a spring mechanism for preloading the seal against a surface of the control surface such that the gap is sealed with the control surface is in a first position relative to the aircraft wing; and at least one cam blade for lifting the seal from the surface of the control surface as the control surface moves from the first position to a second position relative to the aircraft wing and returning the seal to the surface of the control surface as the control surface moves from the second position to the first position.

The first position may correspond to a negative flap angle and the second position corresponds to a first positive flap angle. Additionally, the apparatus may further include an actuator for moving the control surface relative to the aircraft wing. In some embodiments, the cam blade is configured such that the seal is returned to the surface of the control surface by the spring mechanism as the control surface moves from the second position to a third position relative to the aircraft wing, wherein the third position corresponds to a maximum positive flap angle greater than the first positive flap angle. The at least one cam blade may be disposed on the surface of the control surface and may comprise a plurality of cam blades disposed along a length of a leading edge of the control surface for enabling airflow through a plurality of gaps created by the cam blades between the seal and the control surface. In certain embodiments, the spring mechanism may comprise one of a linear spring and a torsional spring and the control surface may comprise a flaperon.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom" or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, as referred to herein in this Specification, the terms "forward", "aft", "inboard", and "outboard" may be used to describe relative relationship(s) between components and/or spatial orientation of aspect(s) of a component or components. The term "forward" may refer to a special direction that is closer to a front of an aircraft relative to another component or component aspect(s). The term "aft" may refer to a special direction that is closer to a rear of-an aircraft relative to another component or component aspect(s). The term "inboard" may refer to a location of a component that is within the fuselage of an aircraft and/or a spatial direction that is closer to or along a centerline of the aircraft relative to another component or component aspect(s), wherein the centerline runs in a between the front and the rear of the aircraft. The term "outboard" may refer to a location of a component that is outside the fuselage-of an aircraft and/or a special direction that farther from the centerline of the aircraft relative to another component or component aspect(s).

Still further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1A:
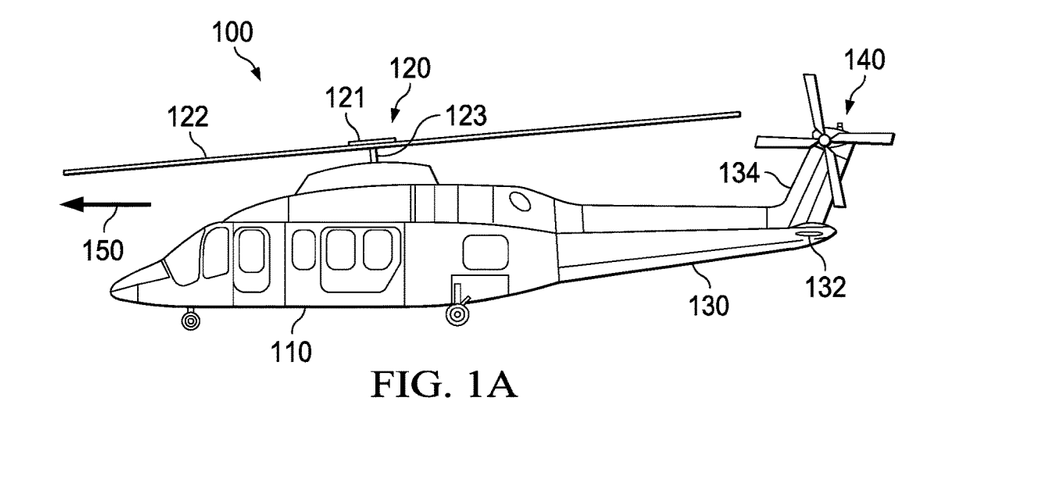
FIGS. 1A-1B and 2 illustrate example aircraft in accordance with certain embodiments of the present disclosure.
Figure 1B:
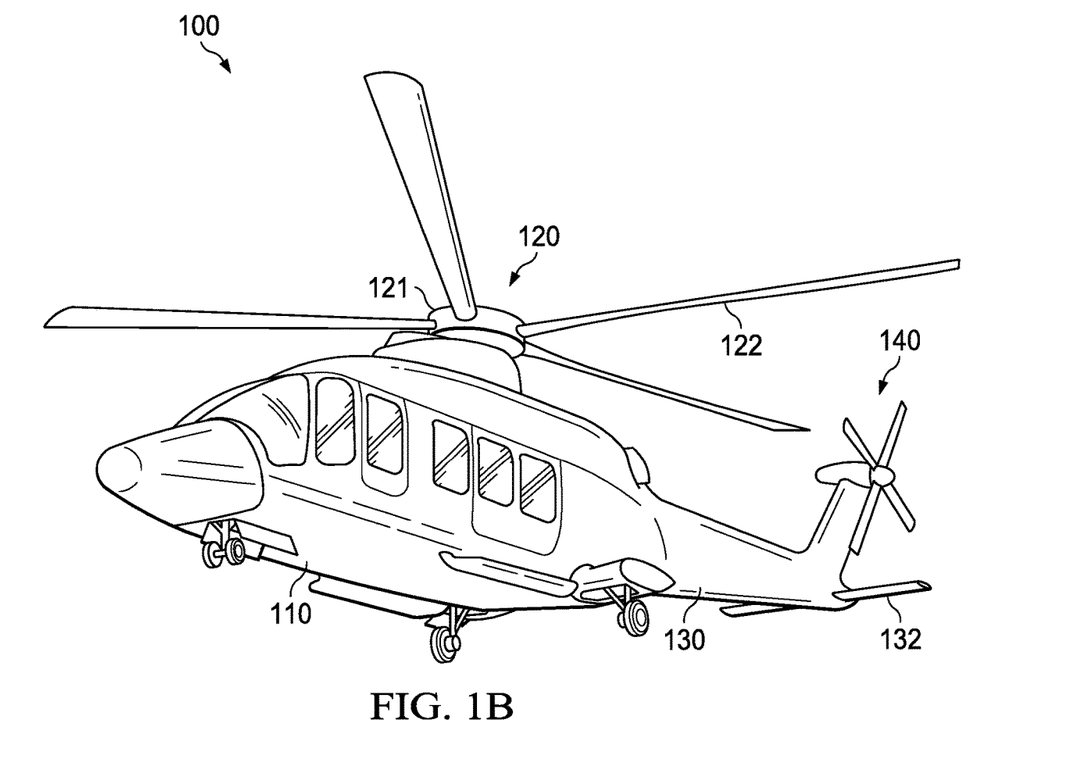

Referring to FIGS. 1A-1B, FIGS. 1A-1B illustrate an example embodiment of an aircraft, which in this example is a rotorcraft 100. FIG. 1A portrays a side view of rotorcraft 100, while FIG. 1B portrays an isometric view of rotorcraft 100. Rotorcraft 100 includes a fuselage 110, a rotor system 120, an empennage 130, and a tail rotor or anti-torque system 140. The fuselage 110 is the main body of the rotorcraft 100, which may include a cabin (e.g., for crew, passengers, and/or cargo) and/or may house certain mechanical components, electrical components, etc. (e.g., engine(s), transmission, flight controls, etc.). The rotor system 120 is used to generate lift for rotorcraft 100. For example, the rotor system 120 (also generally referred to as the "rotor") may include a rotor hub 121 (also referred to as a "rotor hub assembly" or more generally as a "hub") coupled to a plurality of rotor blades 122 (also referred to generally as "blades"). Torque generated by the engine(s) of the rotorcraft causes the rotor blades 122 to rotate, which generates lift. The rotor system 120 is supported by a mast 123. The empennage 130 of the rotorcraft 100 includes a horizontal stabilizer 132, vertical stabilizer 134, and tail rotor or anti-torque system 140. The horizontal stabilizer 132 and vertical stabilizer 134 respectively provide horizontal and vertical stability for the rotorcraft 100. Moreover, tail rotor or anti-torque system 140 may be used to provide anti-torque and/or direction control for the rotorcraft 100.

Figure 2:
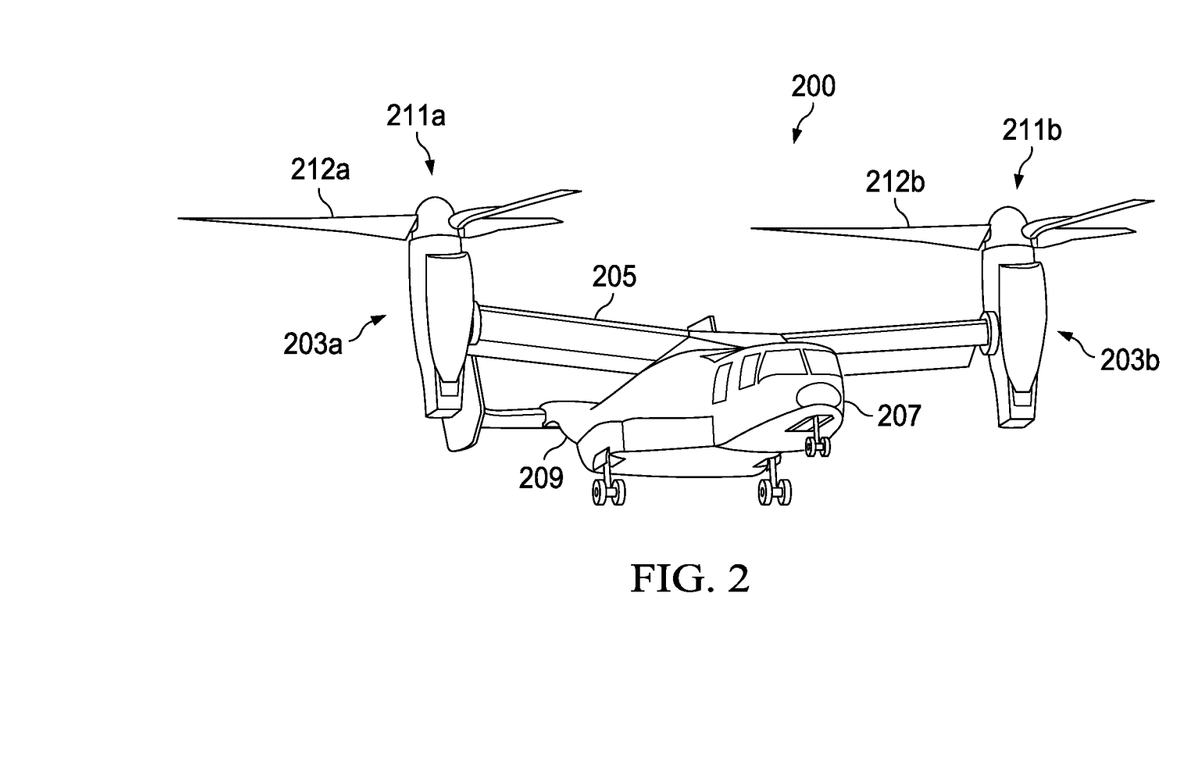

Referring to FIG. 2, FIG. 2 illustrates a perspective view of an example aircraft, which in this example is a tiltrotor aircraft 200. Tiltrotor aircraft 200 includes nacelles 203a and 203b, a wing 205, a fuselage 207, and a tail member 209. Nacelles 203a and 203b respectively include rotor systems 211a and 211b, and each rotor system includes a plurality of rotor blades 212a and 212b, respectively. Moreover, each nacelle 203a and 203b may include engine(s) and gearbox(es) for driving each rotor system 211a and 211b, respectively. In some embodiments, nacelles 203a and 203b may each be configured to rotate between a helicopter mode, in which the nacelles 203a and 203b are approximately vertical (as shown in FIG. 2), and an airplane mode, in which the nacelles 203a and 203b are approximately horizontal. In the illustrated embodiment, the tail member 209 may be used as a vertical stabilizer.

Aircraft such as rotorcraft 100 and tiltrotor aircraft 200 rely on rotor systems (e.g., rotor system 120 and tail rotor or anti-torque system 140 of rotorcraft 100) for flight capabilities, such as controlling (e.g., managing and/or adjusting) flight direction, thrust, and lift of the aircraft. Consider various examples involving rotorcraft 100, which can also be applicable to tiltrotor aircraft 200 in various embodiments. For rotorcraft 100, the pitch of each rotor blade 122 can be controlled using collective control or cyclic control to selectively control direction, thrust, and lift of the rotorcraft 100.

During collective control, all the of rotor blades 122 are collectively pitched together (e.g., the pitch angle is the same for all blades), which effects overall thrust and lift. During cyclic control, the pitch angle of each of the rotor blades 122 varies depending on where each blade is within a cycle of rotation (e.g., at some points in the rotation the pitch angle is not the same for all blades), which can affect direction of travel of the rotorcraft 100.

Aircraft such as rotorcraft 100 of FIGS. 1A-1B and tiltrotor aircraft 200 of FIG. 2 can be subjected to various aerodynamic and operational forces during operation, such as lift, drag, centrifugal force, aerodynamic shears, and so forth. Lift and centrifugal force, for example, are forces produced by the rotation of a rotor system. Lift is an upward force that allows a rotorcraft to elevate, while centrifugal force is a lateral force that tends to pull the rotor blades outward from the rotor hub. These forces can subject the rotor hub, rotor yoke, and/or the rotor blades (referred to herein using the terms "hub/blades", "yoke/blades", "hub/yoke/blades", and variations thereof) to flapping, leading and lagging, and/or bending. For example, flapping is a result of the dissymmetry of lift produced by rotor blades at different positions (typically referred to as "pitch" or "pitch angles") during a single rotation. During rotation, for example, a rotor blade may generate more lift while advancing in the direction of travel of the rotorcraft than while retreating in the opposite direction. A rotor blade may be flapped up (also sometimes referred to as being pitched "nose-up") while advancing in the direction of travel, and may flap down (e.g., pitched "nose-down") while retreating in the opposite direction. When a blade is pitched more nose-up, more lift is created on that blade, which will drag the side of the rotor/hub upward, which makes the hub/yoke flap. For example, for rotorcraft 100 of the embodiment of FIG. 1A, the most aft blade (e.g., nearest to tail rotor or anti-torque system 140) of the rotor system 120 may be pitched more nose-up and the most forward blade may be pitched more nose-down; to provide a forward direction of travel (as generally indicated by arrow 150) for rotorcraft 100.

Several types of aircraft incorporate pylons into their primary wing structure. For example, an airplane wing may incorporate a fixed pylon that includes a jet engine or propeller. In tiltrotor aircraft, pylons are typically mounted at or near the outboard ends of the wing. Each pylon, which includes a proprotor, is rotatable relative to the wing such that the proprotor blades have a generally horizontal plane of rotation providing vertical lift for takeoff, hovering and landing, much like a conventional helicopter, and a generally vertical plane of rotation providing forward thrust for cruising in forward flight with the wing providing lift, much like a conventional propeller driven airplane. In addition, tiltrotor aircraft can be operated in configurations between the helicopter flight mode and the airplane flight mode, which may be referred to as conversion flight mode. A drive system, including an engine or motor, provides rotational energy to the proprotors, and may be located in the fuselage, pylons and/or wing of the tiltrotor aircraft.

Figure 3A:
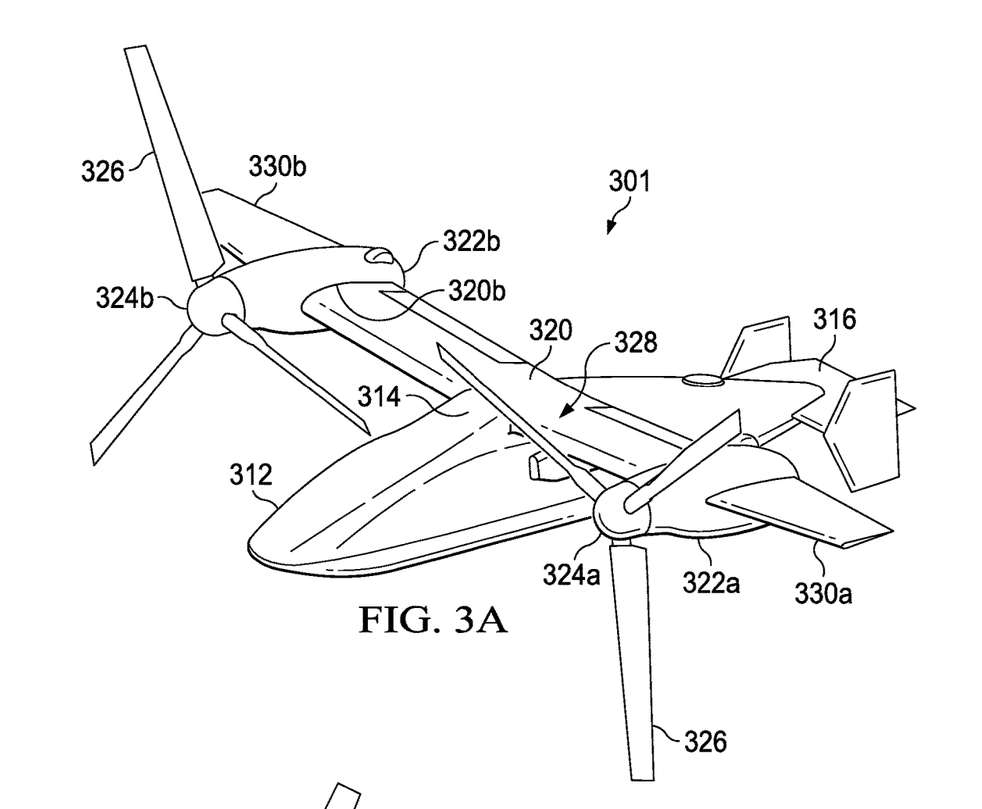
FIGS. 3A-3B are schematic illustrations of a tiltrotor aircraft having wing extensions in accordance with certain embodiments of the present disclosure.
Figure 3B:
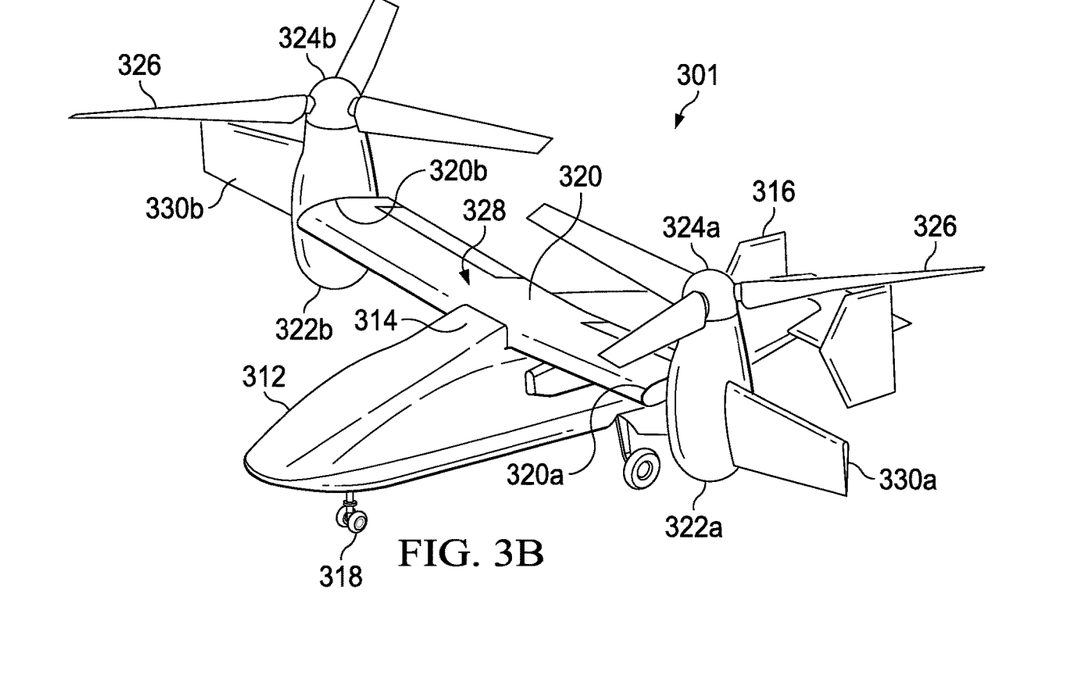

Referring now to FIGS. 3A and 3B, illustrated therein is a tiltrotor aircraft 301. The tiltrotor 301 includes a fuselage 312, a wing mount assembly 314 and a tail assembly 316. Tail assembly 316 may have control surfaces operable for horizontal and/or vertical stabilization during flight. A landing gear system 318 provides ground support for tiltrotor aircraft 301. A wing 320 is supported by fuselage 312 and wing mount assembly 314.

Coupled to outboard ends 320a, 320b of wing 320 are pylon assemblies 322a, 322b. Pylon assembly 322a is rotatable relative to wing 320 between a generally horizontal orientation, as best viewed in FIG. 3A, and a generally vertical orientation, as best viewed in FIG. 3B. Pylon assembly 322a includes a rotatable portion of the drive system and a proprotor assembly 324a that is rotatable responsive to torque and rotational energy provided by an engine or motor of the drive system. Likewise, pylon assembly 322b is rotatable relative to wing 320 between a generally horizontal orientation, as best viewed in FIG. 3A, and a generally vertical orientation, as best viewed in FIG. 3B. Pylon assembly 322b includes a rotatable portion of the drive system and a proprotor assembly 324b that is rotatable responsive to torque and rotational energy provided by an engine or motor of the drive system. In the illustrated embodiment, proprotor assemblies 324a, 324b each include three proprotor blade assemblies 326. It should be understood by those having ordinary skill in the art, however, that proprotor assemblies 324a, 324b could alternatively have a different number of proprotor blade assemblies, either less than or greater than three. In addition, it should be understood that the position of pylon assemblies 322a, 322b, the angular velocity or revolutions per minute (RPM) of proprotor assemblies 324a, 324b, the pitch of proprotor blade assemblies 326 and the like may be controlled by the pilot of tiltrotor aircraft 301 and/or a flight control system to selectively control the direction, thrust and lift of tiltrotor aircraft 301 during flight.

FIG. 3A illustrates tiltrotor aircraft 301 in a forward flight mode or airplane flight mode, in which proprotor assemblies 324a, 324b are positioned to rotate in a substantially vertical plane and provide a forward thrust while a lifting force is supplied by wing 320 such that tiltrotor aircraft 301 flies much like a conventional propeller driven aircraft. FIG. 3B illustrates tiltrotor aircraft 301 in a vertical takeoff and landing (VTOL) flight mode or helicopter flight mode, in which proprotor assemblies 324a, 324b are positioned to rotate in a substantially horizontal plane and provide a vertical thrust such that tiltrotor aircraft 301 flies much like a conventional helicopter. During operation, tiltrotor aircraft 301 may convert from helicopter flight mode to airplane flight mode following vertical takeoff and/or hover. Likewise, tiltrotor aircraft 301 may convert back to helicopter flight mode from airplane flight mode for hover and/or vertical landing. In addition, tiltrotor aircraft 301 can perform certain flight maneuvers with proprotor assemblies 324a, 324b positioned between airplane flight mode and helicopter flight mode, which can be referred to as conversion flight mode.

Wing 320 and pylon assemblies 322a, 322b form part of a propulsion and lift system 328 for tiltrotor aircraft 301. Fuselage 312 may include a drive system, including an engine, motor and/or transmission, for providing torque and rotational energy to each proprotor assembly 324a, 324b via one or more drive shafts located in wing 320. In other embodiments, each pylon assembly 322a, 322b houses a drive system, such as an engine, motor and/or transmission, for supplying torque and rotational energy to a respective proprotor assembly 324a, 324b. In such embodiments, the drive systems of each pylon assembly 322a, 322b, may be coupled together via one or more drive shafts located in wing 320 such that either drive system can serve as a backup to the other drive system in the event of a failure. In tiltrotor aircraft having both pylon and fuselage mounted drive systems, the fuselage mounted drive system may serve as a backup drive system in the event of failure of either or both of the pylon mounted drive systems.

Example embodiments associated with a slotted flaperon seal mechanism are described below with more particular reference to the remaining FIGURES. It should be appreciated that the rotorcraft 100 of FIGS. 1A-1B, tiltrotor aircraft 200 of FIG. 2, and tiltrotor aircraft 301 of FIGS. 3A-3B are merely illustrative of a nearly unlimited variety of aircraft in connection with which embodiments of the present disclosure described and illustrated herein may be advantageously implemented. Other aircraft implementations can include, for example, fixed wing airplanes, hybrid aircraft, unmanned aircraft, gyrocopters, a variety of helicopter configurations, and drones, among other examples. The FIGURES and the corresponding descriptions are applicable to any type of aircraft. Moreover, it should be appreciated that even though aircraft are particularly well suited to implement embodiments of the present disclosure, the described embodiments can also be implemented using non-aircraft vehicles and devices.

Figure 4:
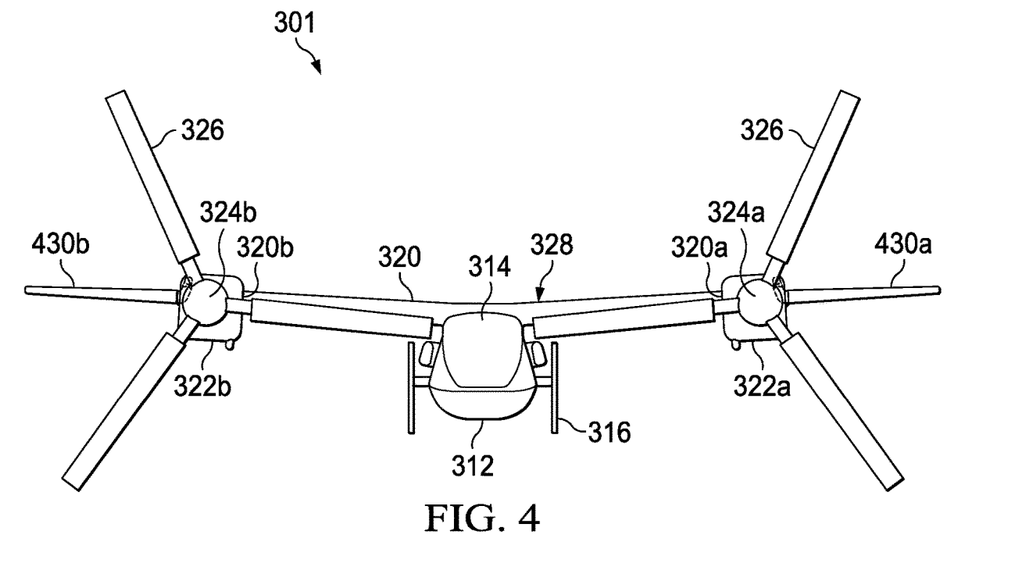
FIG. 4 is a schematic illustration of a tiltrotor aircraft in a flight mode in accordance with certain embodiments of the present disclosure.

Referring to FIG. 4, in one embodiment, aircraft 301 may include wing extensions 430a, 430b, which may be fixedly or rotatably coupled to the outboard ends of pylon assemblies 322a, 322b, respectively. Wing extensions 430a, 430b may be any length relative to wing 320. In one example, the length of each wing extension 430a, 430b may be between 20 to 45 percent of the length of wing 320. In a more specific non-limiting example, the length of each wing extension 430a, 430b may be between 35 to 40 percent of the length of wing 320. As shown in FIG. 4, wing extensions 430a, 430b are extended outboard, away from fuselage 312, to increase the wingspan of tiltrotor aircraft 301 during flight. Wing 320 and wing extensions 430a, 430b form a plane that provides lift for tiltrotor aircraft 301. In particular, wing 320 and wing extensions 430a, 430b form a substantially horizontal plane, which encompasses anhedral or dihedral wing or wing extension configurations. Wing extensions 430a, 430b provide an increased wingspan for tiltrotor aircraft 301 in flight mode, thereby increasing the efficiency of tiltrotor aircraft 301 in flight.

Figure 5:
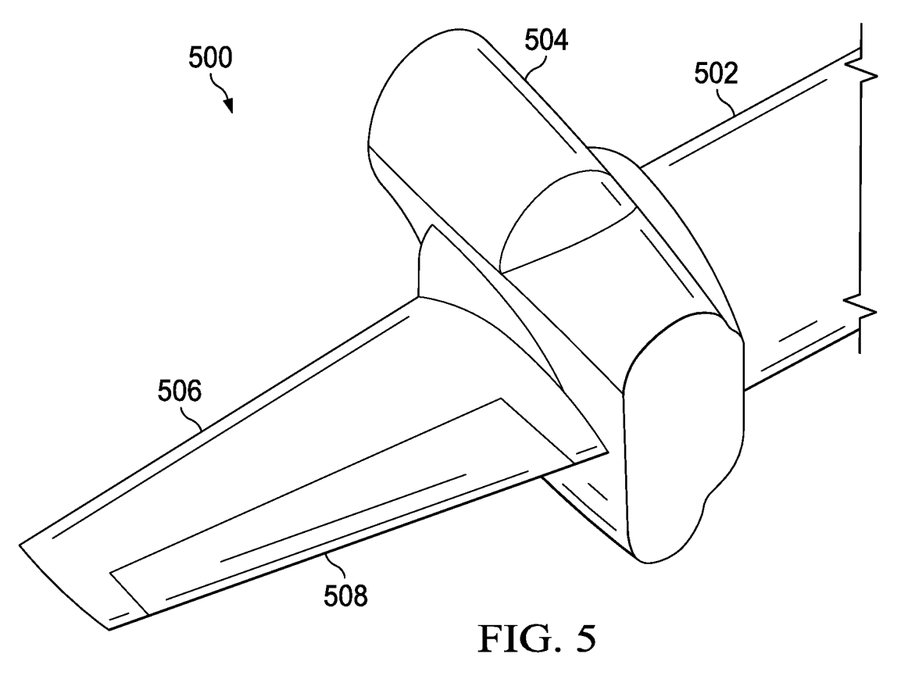
FIG. 5 illustrates a portion of an aircraft wing in which a slotted flaperon seal mechanism in accordance with certain embodiments of the present disclosure may be advantageously implemented.

FIG. 5 illustrates a portion of an example aircraft wing assembly 500 which includes primary portion 502, a pylon 504, and a wing extension 506. In accordance with features of embodiments described herein, the wing extension 506 includes a control surface 508 on a trailing edge thereof for controlling aircraft roll and/or lift. In the embodiment illustrated in FIG. 5, the control surface 508 is implemented as a slotted flap or flaperon, but it will be recognized that techniques described herein may be advantageously implemented with other trailing edge control surface configurations having a gap, or slot. In summary, the wing assembly 500 comprises a wing including a control surface comprising an airfoil and including a leading edge hingedly connected to a trailing edge of the wing.

Figure 6:
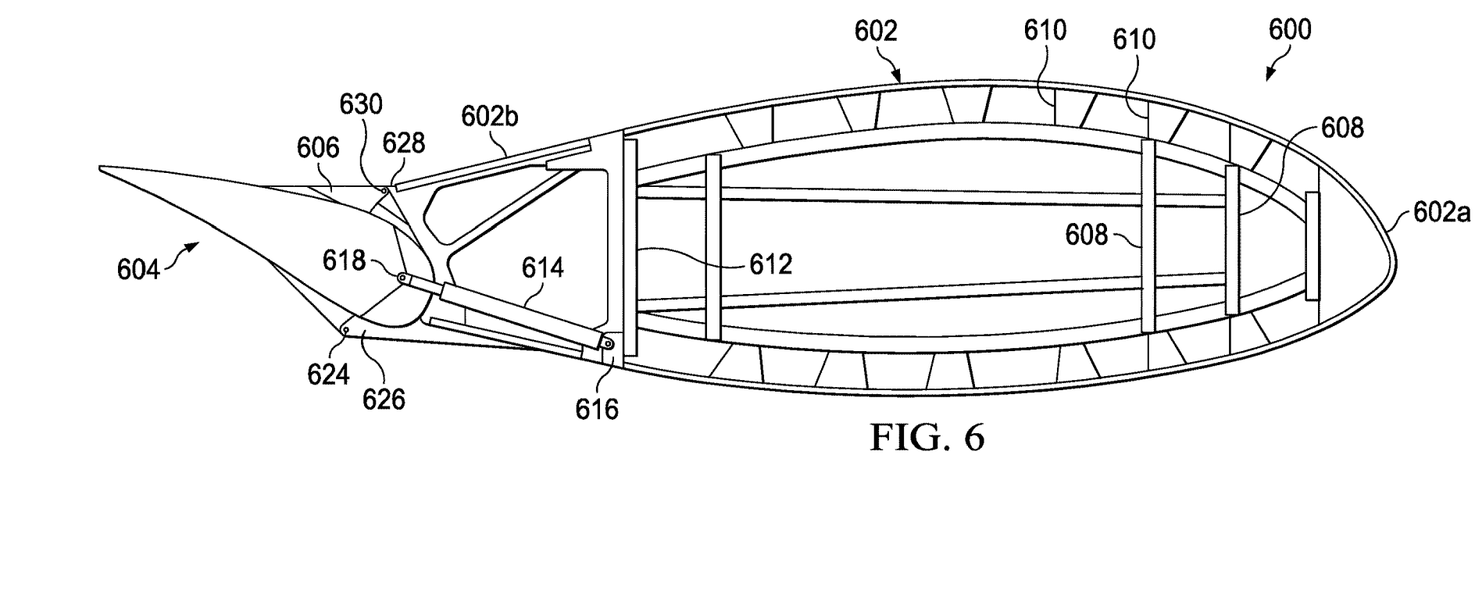
FIG. 6 is a cutaway side view of an aircraft wing assembly including a main wing portion, a flaperon, and a slotted flaperon seal mechanism in accordance with certain embodiments of the present disclosure.

Referring now to FIG. 6, illustrated therein is a cutaway side view of an aircraft wing assembly 600 in accordance with embodiments described herein. Wing assembly 600 includes a main wing portion 602 comprising a leading edge 602a and a trailing edge 602b, a flaperon 604 having a leading edge 604a and a trailing edge 604b, and a flaperon seal 606. The main wing portion 602 has a conventional internal structure, including stiffeners 608 and stringers 610. A rear spar 612 also forms an integral part of main wing portion 602. An actuator 614 is pivotally attached to rear spar 612 at point 616. The actuator, designed to telescopically extend toward the trailing edge 602b of main wing portion 602, pivotally connects to flaperon 604 at connection point 618. Flaperon 604 is hingedly connected at hinge axis 624 by means of a fitting 626 which extends rearwardly below main wing portion 602. Actuator 614 attaches to flaperon 604 at point 618, off-axis to hinge point 624. Therefore, when the actuator 614 telescopes toward the flaperon 604, the flaperon moves away from the trailing edge 602b of the main wing portion 602, and rotates about hinge axis 624. Flaperon seal 604 includes a contoured plate of sufficient span and length which is pivotally attached to its forward end about a hinge line 628. This attachment is made to a fitting 630, which extends from the trailing edge 602b of the main wing section 602.

Figure 7A:
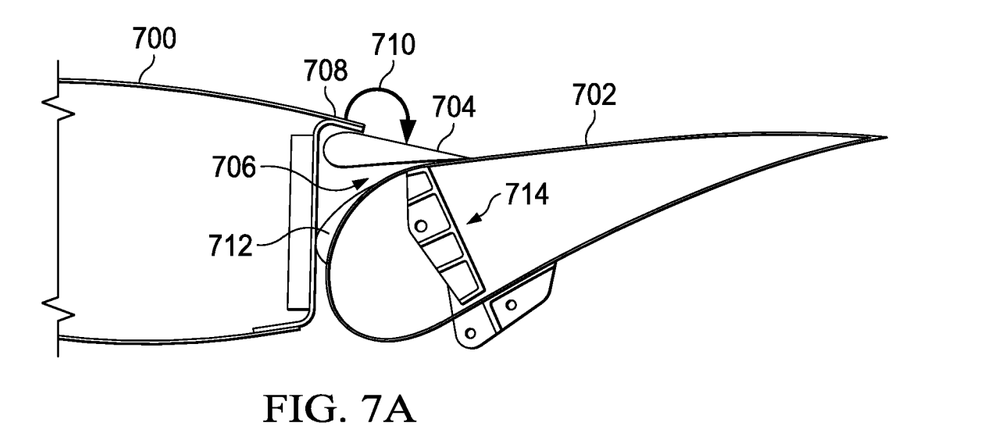
FIGS. 7A-7D are side views of a portion of an aircraft wing having a slotted flaperon illustrating operation of a slotted flaperon seal mechanism in accordance with certain embodiments of the present disclosure.
Figure 7B:
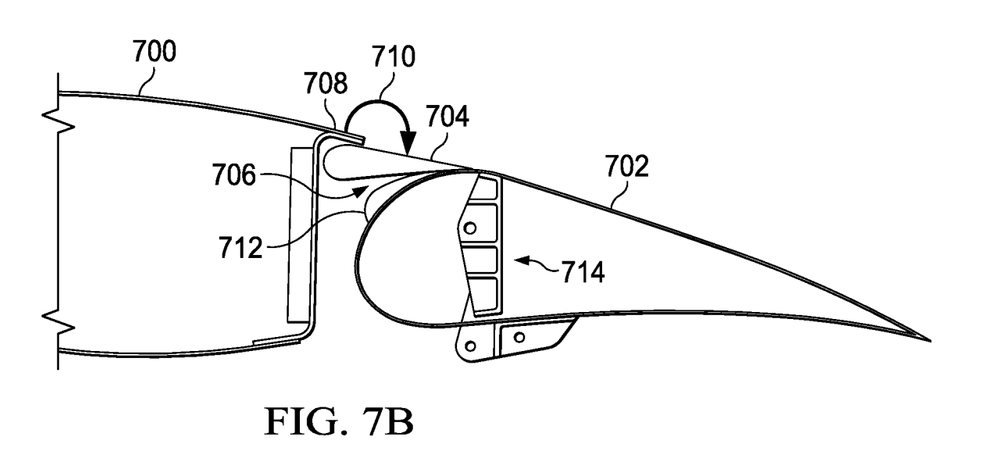
Figure 7C:
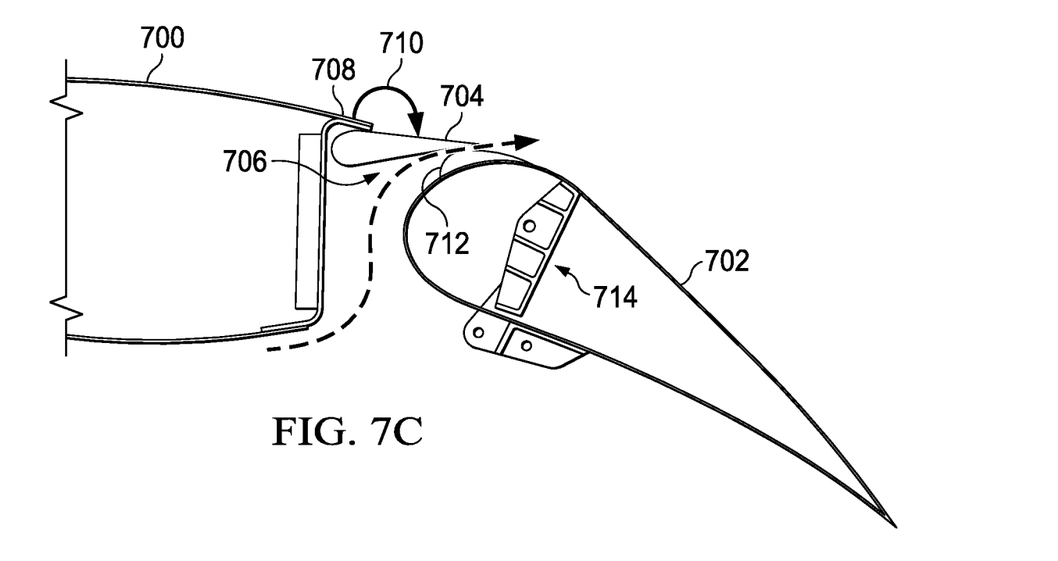
Figure 7D:
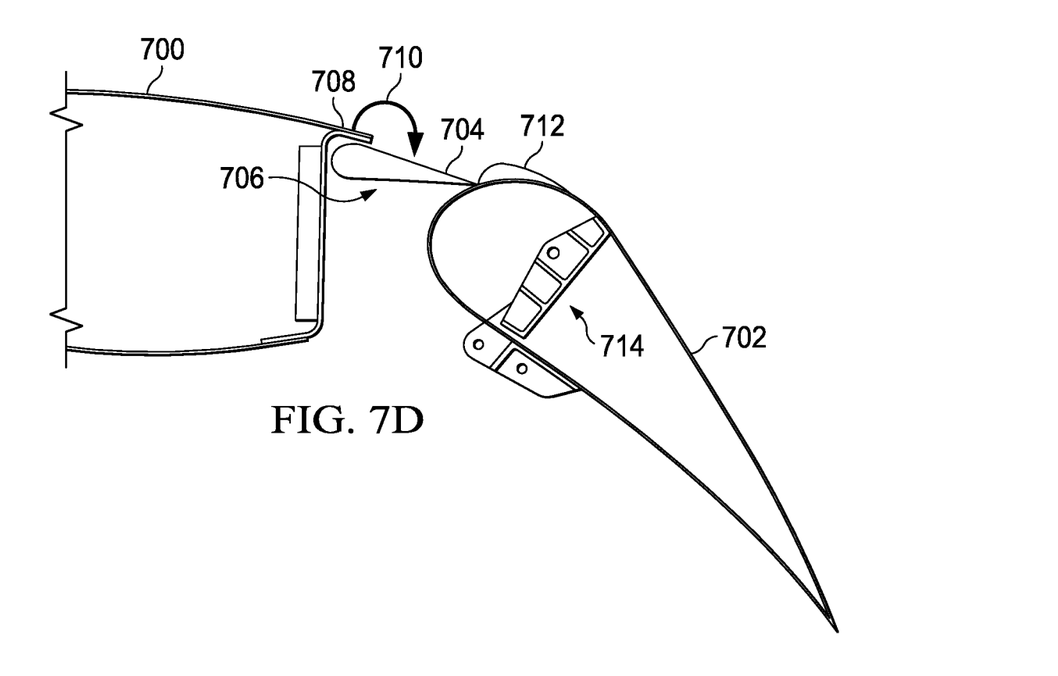

FIGS. 7A-7D are simplified side views of a portion of an aircraft wing assembly 700 comprising a main wing portion 701 having a slotted flaperon 702 hingedly connected to a trailing edge thereof. Internal features of wing assembly 700, including connection of the flaperon 702 to the main wing portion 701, are identical to those of wing assembly 600; therefore, only the details necessary to provide a clear understanding of the operation of current embodiments are shown in FIGS. 7A-7D. As shown in FIGS. 7A-7D, seal 704 is provided over a gap, or slot, 706 that exists between the main wing portion 701 and the flaperon 702. As noted above with reference to FIG. 6, the seal 704 is hingedly connected to the trailing edge of main wing portion 701 such that the seal is capable of some degree of rotation up and down relative to the wing portion 701. In accordance with features of embodiments described herein, a spring mechanism 708, which may be a torsional or linear spring, for example, is provided for pre-loading the seal 704 in a direction indicated by an arrow 710 such that the seal 704 is pressed (downward) toward the flaperon 702 to seal the gap between the wing portion 701 and the flaperon 702. As shown in FIG. 7A, when the flaperon 702 is in a "full up," or negative flap angle position, the pre-loading of the seal 704 operates to completely close off, or seal, the slot 706 to prevent airflow therethrough. Referring to FIG. 7B, when the flaperon is in a neutral position (which may be defined as a 0-degree orientation relative to horizontal), the pre-loading of the seal 704 again operates to completely close off, or seal, the slot 706 to prevent airflow therethrough. In accordance with features of embodiments described herein, at least one cam blade 712 is provided such that as the flaperon 702 moves from the neutral position (FIG. 7B) toward a positive flap angle, as illustrated in FIG. 7C, the at least one cam blade 712 forces the flap 704 upward away from the surface of the flaperon 702, releasing the seal and allowing air to pass from the lower wing surface to the upper wing surface, re-energizing airflow at high flap angles such as illustrated in FIG. 7C. Finally, when the flaperon 702 is in at a maximum flap angle, as illustrated in FIG. 7D, the design of the cam blade 712 combined with the pre-loading of the seal 704 by the spring 708 may once again allow the seal to rest on the surface of the flaperon 702 again sealing the slot 706.

Figure 8:
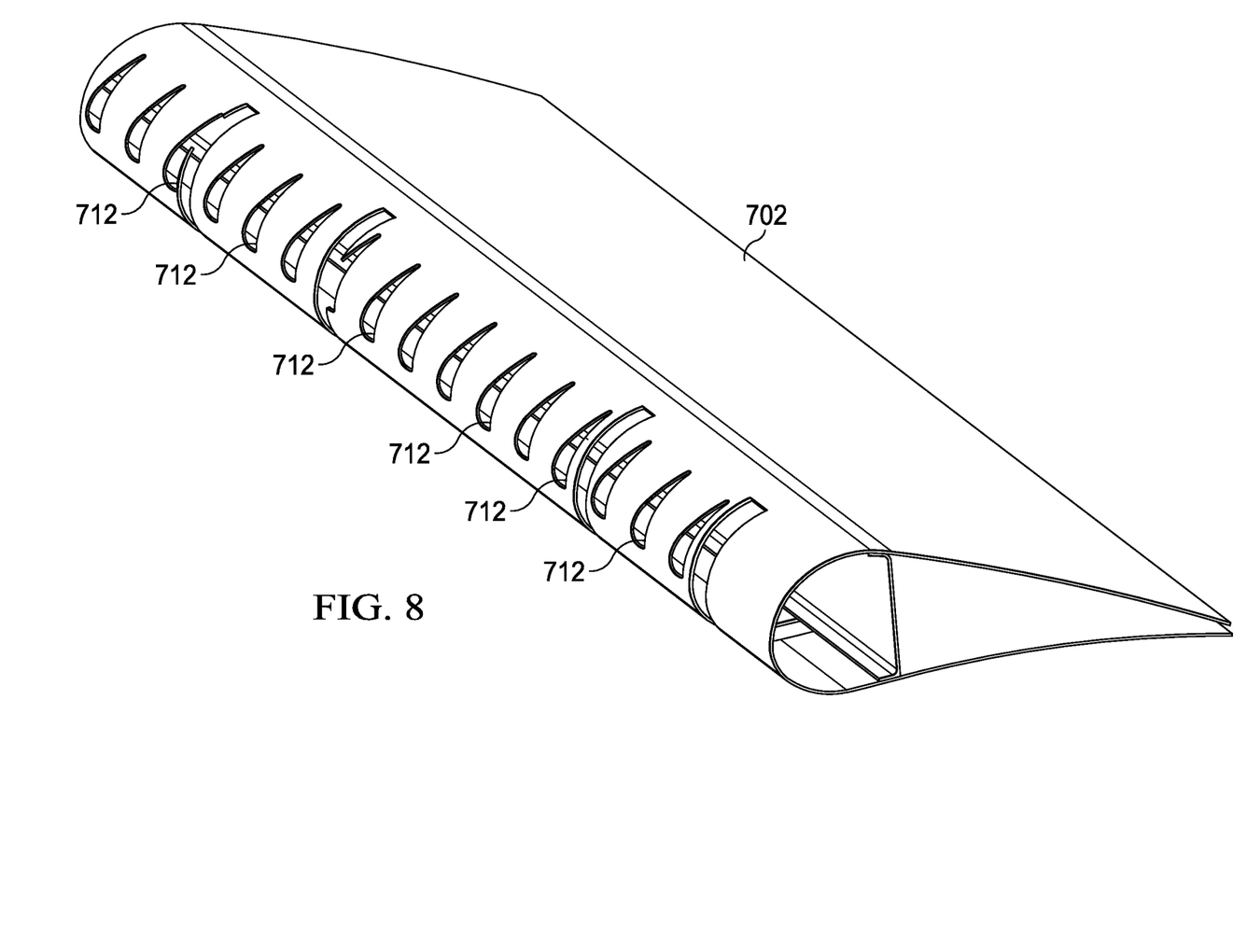
FIG. 8 is an isometric view of the flaperon of FIGS. 7A-7B illustrating additional details of a slotted flaperon seal mechanism in accordance with certain embodiments of the present disclosure.

In certain embodiments, the cam blades 714 may be constructed of an engineering thermoplastic, such as polyoxymethylene ("POM"), which is commercially available under the name Delrin; however, it will be understood that a variety of other appropriate materials may be used without departing from the spirit of the scope of embodiments described herein. Additionally, the cam blades may serve to align the airflow as it exits the slot, thus providing more uniform airflow across flaperon and further mitigating flow separation across the wing surface. It will be recognized that the cam blades can be designed such that they implement a pre-selected "schedule" with regard to position of the seal and corresponding gap for various flap angle settings FIG. 8 is an isometric view of the flaperon of FIGS. 7A-7C illustrating additional details of a slotted flaperon seal mechanism in accordance with certain embodiments of the present disclosure. In particular, as best shown in FIG. 8, multiple cam blades 712 may be disposed along the leading edge of the flaperon 702 so as to provide lift across the flap 712, enabling airflow between the cam blades 712 in the gaps created by the cam blades between the bottom surface of the flap 704 and surface of the flaperon 702.

In summary, the present structure provides a wing structure and slotted flaperon seal mechanism. The mechanism defines the motion of the flaperon, flaperon seal, and resulting gap during up and down motion of the flaperon relative to the wing, thus maximizing the performance of the aircraft. By way of the present invention, a reliable yet relatively simple structure is provided for automatically setting the flaperon seal in response to the position of the flaperon. The position of the flaperon seal for any setting of the flaperon can be readily designed to maximize wing performance and reduce drag by simply altering the design of the cam blades that lift the flap from the flaperon.

The embodiments described throughout this disclosure provide numerous technical advantages, including by way of example, providing additional maximum lift capacity and improving short take off capabilities by providing a sealing mechanism for a slotted flap or flaperon using a design that does not incur the additional weight and complexity penalties of prior sealing mechanisms.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Still further, while embodiments have been illustrated and described with reference to a particular type of rotorcraft and control surface, it will be understood that certain embodiments may be advantageously implemented in connection with any type of aircraft having a wing including a control surface comprising an airfoil including a leading edge and a trailing edge, wherein the leading edge of the control surface is hingedly connected to a trailing edge of the wing.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

What is claimed is:

1. An apparatus comprising: an aircraft wing;
   a control surface hingedly connected to a trailing edge of the aircraft wing, wherein an aerodynamic slot is provided between the aircraft wing and the control surface;
   a seal disposed over the aerodynamic slot, the seal having a hinged connection to the aircraft wing;
   a spring mechanism for preloading the seal against a surface of the control surface such that a gap is sealed with the control surface is in a first position relative to the aircraft wing; and
   at least one cam blade for lifting the seal from the surface of the control surface as the control surface moves from the first position to a second position relative to the aircraft wing and returning the seal to the surface of the control surface as the control surface moves from the second position to the first position;
   wherein the first position corresponds to a negative flap angle and the second position corresponds to a first positive flap angle; and
   wherein the cam blade is configured such that the seal is returned directly to the surface of the control surface by the spring mechanism as the control surface moves from the second position to a third position relative to the aircraft wing, wherein the third position corresponds to a maximum positive flap angle greater than the first positive flap angle.

2. The apparatus of claim 1 further comprising an actuator for moving the control surface relative to the aircraft wing.

3. The apparatus of claim 1, wherein the at least one cam blade is disposed on the surface of the control surface.

4. The apparatus of claim 1, wherein the at least one cam blade comprises a plurality of cam blades disposed along a length of a leading edge of the control surface for enabling airflow through a plurality of gaps created by the cam blades between the seal and the control surface.

5. The apparatus of claim 1, wherein the spring mechanism comprises at least one of a linear spring and a torsional spring.

6. The apparatus of claim 1, wherein the control surface comprises a flaperon.

7. A rotorcraft comprising: an aircraft wing;
   a control surface hingedly connected to a trailing edge of the aircraft wing, wherein an aerodynamic slot is provided between the aircraft wing and the control surface;
   a seal disposed over the aerodynamic slot, the seal having a hinged connection to the aircraft wing;
   a spring mechanism for preloading the seal against a surface of the control surface such that a gap is sealed with the control surface is in a first position relative to the aircraft wing; and
   at least one cam blade for lifting the seal from the surface of the control surface as the control surface moves from the first position to a second position relative to the aircraft wing and returning the seal to the surface of the control surface as the control surface moves from the second position to the first position;
   wherein the first position corresponds to a negative flap angle and the second position corresponds to a first positive flap angle; and
   wherein the cam blade is configured such that the seal is returned directly to the surface of the control surface by the spring mechanism as the control surface moves from the second position to a third position relative to the aircraft wing, wherein the third position corresponds to a maximum positive flap angle greater than the first positive flap angle.

8. The rotorcraft of claim 7 further comprising an actuator for moving the control surface relative to the aircraft wing.

9. The rotorcraft of claim 7, wherein the at least one cam blade is disposed on the surface of the control surface.

10. The rotorcraft of claim 7, wherein the at least one cam blade comprises a plurality of cam blades disposed along a length of a leading edge of the control surface for enabling airflow through a plurality of gaps created by the cam blades between the seal and the control surface.

11. The rotorcraft of claim 7, wherein the spring mechanism comprises at least one of a linear spring and a torsional spring.

12. The rotorcraft of claim 7, wherein the control surface comprises a flaperon.

13. An aircraft wing comprising:
   a control surface hingedly connected to a trailing edge of the aircraft wing, wherein an aerodynamic slot is provided between the aircraft wing and the control surface;
   a seal disposed over the aerodynamic slot, the seal having a hinged connection to the aircraft wing;
   a spring mechanism for preloading the seal against a surface of the control surface such that a gap is sealed with the control surface is in a first position relative to the aircraft wing; and at least one cam blade for lifting the seal from the surface of the control surface as the control surface moves from the first position to a second position relative to the aircraft wing and returning the seal to the surface of the control surface as the control surface moves from the second position to the first position;

wherein the first position corresponds to a negative flap angle and the second position corresponds to a first positive flap angle; and wherein the cam blade is configured such that the seal is returned directly to the surface of the control surface by the spring mechanism as the control surface moves from the second position to a third position relative to the aircraft wing, wherein the third position corresponds to a maximum positive flap angle greater than the first positive flap angle.

14. The aircraft wing of claim 13, wherein the at least one cam blade comprises a plurality of cam blades disposed along a length of a leading edge of the control surface for enabling airflow through a plurality of gaps created by the cam blades between the seal and the control surface.

15. The aircraft wing of claim 13, wherein the spring mechanism comprises at least one of a linear spring and a torsional spring.

* * * * *